Figure 1:
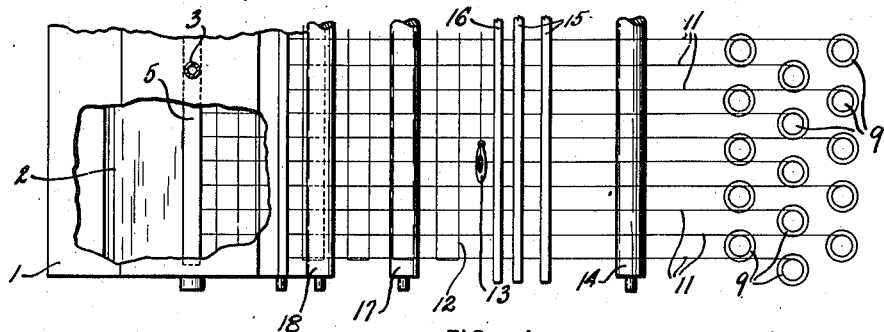

Oct. 27, 1936.  L. E. LOVETT  2,058,476
MANUFACTURE OF REENFORCED SHEET MATERIAL
Filed Oct. 26, 1933

INVENTOR
LOUIS E. LOVETT
BY
ATTORNEYS

Patented Oct. 27, 1936

2,058,476

UNITED STATES PATENT OFFICE 2,058,476

MANUFACTURE OF REENFORCED SHEET MATERIAL

Louis E. Lovett, Cleveland Heights, Ohio, assignor to Industrial Rayon Corporation, Cleveland, Ohio, a corporation of Delaware Application October 26, 1933, Serial No. 695,371

5 Claims. (Cl. 28—1)

This invention relates to a method and apparatus for making reenforced sheet material, such as reenforced transparent paper, from plastic materials.

Sheets prepared from suitable plastic materials, such as cellulose acetate, viscose, or other dopes containing a cellulose radical, may be reenforced by spreading the dope over a coarse-mesh fabric or otherwise incorporating woven threads into the mass. It has, however, been found practically impossible to hold the woven fabric in such manner that the threads will lie straight and thus present a pleasing appearance where the sheet is transparent or translucent. This difficulty is due to the fact that the warp and woof threads exert an unequal tension on each other in various portions of the fabric. In order to cause the threads to lie straight, it would be necessary to resort to tentering, a slow and tedious operation that would interfere with the continuous production of reenforced sheets.

To avoid this difficulty and make possible the production of a reenforced transparent sheet in which the reenforcing threads lie straight, the present invention provides a method in which the reenforcing fabric is not previously prepared but is woven only as fast as the finished sheet is made so that but a few woof threads are present at any time in the unset condition before being set in the material of the sheet, the warp threads being held at one end in the plastic dope, which may set quickly and act as a sizing helping to hold the warp threads in alignment. Briefly, the dope may serve as a sizing medium to hold the warp threads in proper relative position to constitute a base for the woof threads without subjecting the latter to tension.

It is, accordingly, an object of my invention to provide a method of forming a reenforced sheet from dopes of plastic material in which the dope acts as sizing material causing the reenforcing threads to lie straight. Another object of the invention is to provide a method of preparing a reenforced sheet in which the reenforcing fabric is woven only as fast as it is set in the dope. A further object of the invention is to provide means for forming an improved reenforced sheet in which the reenforcing threads are disposed uniformly in straight lines.

In the practice of the invention, the dope of plastic material, such as a dope of viscose, cellulose acetate, cellulose nitrate, or other plastic material, may be flowed onto a suitable surface where it may contact with the woven fabric which is to constitute the reenforcement. Any appropriate means of delivery may be used for supplying the dope and any suitable surface can be used, although a rotating roller is found to be well adapted to the purpose. The fabric may be woven by any conventional means disposed in the vicinity of the dope-delivering mechanism and is promptly brought in contact with the dope as soon as it is woven and before the dope sets.

Figure 2:
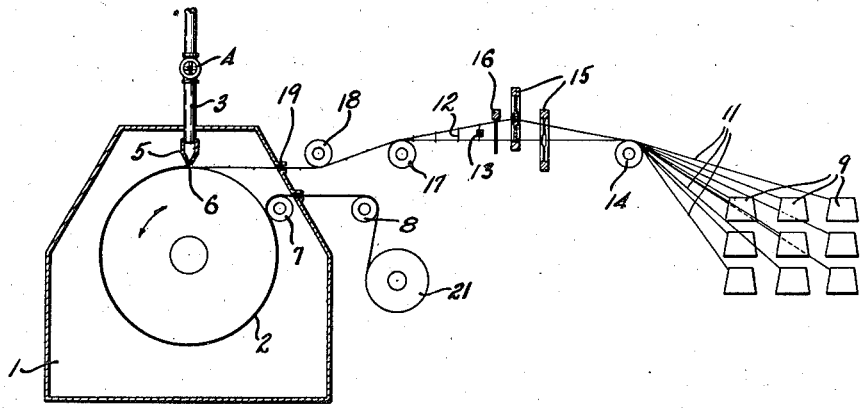
Figure 3:
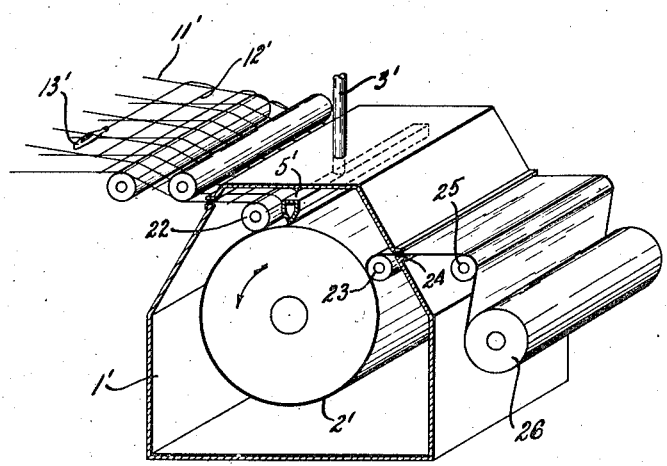

Two forms of apparatus for carrying the invention into effect are more or less diagrammatically illustrated in the accompanying drawing, although it will be understood that other forms of apparatus may also be used for carrying out the invention. In said drawing, Fig. 1 is a fragmentary plan of sheet-forming elements and weaving means in association therewith; Fig. 2 is a side elevation corresponding to Fig. 1; and Fig. 3 is a perspective of a modified arrangement of sheet-forming elements and weaving means.

Referring to Fig. 1 of the drawing, a housing 1 contains a rotatable roller 2 on the surface of which dope, such as cellulose acetate, is flowed through a feed line 3 controlled by a valve 4 and communicating with a nozzle or casting head 5. This nozzle or casting head extends longitudinally of the roller 2 and ejects the dope through an elongated slot 6 in the form of a sheet which adheres to the surface of the roller 2 and is carried around on the rotating surface over guide rolls 7 and 8. During this travel, the dope becomes set, as by heat supplied by heating the roller 2 or by supplying a heated atmosphere in the casing 1. Any vapors evolved from the sheet can be drawn off through the casing without escaping into the room and affecting the workmen.

For the purpose of supplying a reenforcement for a transparent sheet formed in the above mentioned manner are also provided means for weaving a more or less coarse or open-mesh fabric in the vicinity of the sheet-forming operation and supplying this fabric to the sheet as fast as it is woven. This means may comprise any suitable weaving mechanism, such as that diagrammatically illustrated in the drawing which comprises a creel carrying cones 9 for delivering warp threads 11 which run under the casting head 5 and over the roller or drum 2 where they are firmly held in spaced alignment by the material of the sheet which has set as it travels around on the drum. At the same time, woof threads 12 are woven through the warp threads by means of a shuttle 13. In a conventional manner the warped threads may run from the packages 9 over a roller 14 and through a harness 15, by which the threads may be alternately raised and lowered in the customary manner. A reed 16 may maintain these warp threads in parallel alignment and shuttle 13 may pass back and forth to weave the woof thread across the warp to form a more or less open mesh.

The woven portion then travels between rollers 17 and 18 and through a slot 19 in the housing 1. It next passes over the roller 2 and under the casting head 5 where it is covered with the dope extruded through the elongated slot 6 which coats the threads and fills the mesh. Since the dope quickly sets on the drum 2, there is no opportunity for a quantity of fabric to be formed in the unset condition. Thus, the shuttle 13 may be timed with the rotation of the roller or drum 2 so that only a few threads 12 exist in the unset condition at any given moment. This is important since it is the pull of the cross threads on the warp threads which distorts the fabric in the methods of manufacturing such reenforced sheets heretofore used and, in methods of producing such sheets, such as those provided by the present invention, where only a few of these cross threads are in the uncoated portion of the fabric at any given time, the dope acting as a sizing medium to hold the warp threads in position, the amount of tension and resulting distortion is negligible or absent. Once the dope has been applied to the threads and set, no subsequent distortion is possible since the threads are firmly held in position in a matrix of set material.

The sheet, which now consists of the set material delivered through the dope line 3 together with the woven fabric embedded therein, passes over the rolls 7 and 8 and may be collected on a roll 21. Removal of the sheet from the drum may be facilitated by incorporating a small amount of wax in the dope.

In the foregoing description of the invention, the reenforced transparent sheet was formed by flowing the dope of plastic material, such as cellulose acetate, onto the woven threads as fast as the fabric containing them was formed. It is also possible to extrude the dope first and press the woven threads into the material on the surface of the roller before it has time to set. An apparatus for carrying on the process in this manner is illustrated in Fig. 3 of the drawing wherein a casing 1' encloses a roller or drum 2' to which dope is applied through a dope line 3' controlled by a valve. The dope line communicates with a casting head 5' which spreads the dope on the roller 2' in the same manner as described in connection with Figs. 1 and 2. In this instance, however, the fabric threads are not caused to travel under the casting head to become coated with dope but are brought to the drum at a point subsequent to the place where the dope is extruded. The fabric is woven in the same way, warp threads 11' being carried over a roller 22 mounted adjacent the drum 2' and pressing thereagainst at a point subsequent to the place where the dope is extruded onto the drum by the casting head 5'. Woof threads 12' are woven in the same manner through the warp threads by means of a shuttle 13' and are brought into contact with the drum 2' as fast as they are woven. The woven fabric is pressed into the surface of the still soft dope which has been extruded through the casting head 5' and is fixed in position in the sheet, with the constituent threads still lying straight, by the setting of the dope. The threads of the fabric are coated by the soft material and are thoroughly incorporated into the structure of the reenforced sheet similarly to the result attained by the method as practiced in connection with the apparatus shown in Figs. 1 and 2 of the drawing. Incorporation of the threads into the sheet may be aided by wetting the threads with a solvent for the plastic material, such as acetone where cellulose acetate constitutes the dope or other appropriate solvent where other plastic materials are used. The reenforced sheet is held against the drum by means of a roller 23 until set and is led out of the casing 1' through a slot 24, over a roller 25 and is collected on a roller 26.

By the foregoing method, a suitable sheet such as a sheet of transparent paper, can be prepared and reenforced by means of rayon or cotton threads in the form of a mesh with the threads lying straight in the paper without irregularities or distortions which are ordinarily unavoidable in a piece of fabric. This is brought about by retaining the ends of the warp threads of the fabric in the plastic material going to form the sheet, the plastic material acting as sizing, and weaving the woof threads only as fast as these can be incorporated in the material of the sheet, which is then quickly set. Preferably, as few woof threads as possible are allowed to exist in the unset condition and the fabric will be woven as near as possible to the casting head which delivers the dope to the roller or drum on which the paper is formed. This will be determined largely by the arrangement of apparatus used. Any means of casting the dope in the form of a sheet of desired thickness may be used and any form of weaving means which can be operated adjacent the sheet-forming means may be utilized. In a simple form, such apparatus consists, for example, of a rotatable drum and a casting head for depositing dope on such drum together with a loom adjacent the drum and a shuttle operating in such loom to weave the fabric. The operating means for this shuttle is preferably synchronized with the drive for the drum so that the shuttle will weave only as fast as the fabric is taken up on the drum. The invention is applicable to the formation of reenforced sheets from viscose and cellulose ester dopes or, in fact, any plastic materials which are capable of being formed into a useful sheet.

It is obvious that the apparatus shown for carrying out the methods for the present invention is purely illustrative and that the methods of the present invention may be carried out on other forms of apparatus without departing from the scope of the invention. It is intended that the patent shall cover, by suitable expression in the appended claims, whatever features of patentable novelty reside in the invention.

What I claim is:

1. A method of reenforcing paper made from a dope of plastic material which comprises utilizing said dope of plastic material to hold warp threads in proper relative position, weaving woof threads across said warp threads to form a coarse-mesh fabric, flowing said dope of plastic material onto the resulting fabric as fast as it is woven, and setting said dope of plastic material.

2. A method of reenforcing paper made from a cellulosic dope which comprises weaving a coarse-mesh textile fabric, flowing said cellulosic dope onto said textile fabric in situ as said textile fabric is woven, and setting said cellulosic dope in contact with said textile fabric.

3. A method of reenforcing transparent paper made from cellulose acetate which comprises weaving a coarse-mesh textile fabric, flowing the cellulose acetate onto said textile fabric in situ as said textile fabric is woven, and setting the cellulose acetate in contact with said textile fabric.

4. A method of reenforcing transparent paper made from viscose which comprises weaving a coarse-mesh textile fabric, flowing the viscose onto said textile fabric in situ as said textile fabric is woven, and setting the viscose in contact with said textile fabric.

5. A method of making reenforced paper from a plastic material which comprises flowing said plastic material to form a sheet, drawing warp threads along with said sheet, weaving woof threads into said warp threads to form a coarse-mesh fabric, and setting said plastic material with the fabric formed from said warp and woof threads incorporated therein.

LOUIS E. LOVETT.